United States Patent [19]

Nishioka et al.

[11] Patent Number: 4,542,164

[45] Date of Patent: Sep. 17, 1985

[54] FLAME-RETARDANT POLYOLEFIN FOAM

[75] Inventors: Takeshi Nishioka, Otsu; Akira Nakamura; Kenji Yabe, both of Shiga, all of Japan

[73] Assignee: Toray Industries, Incorporated, Japan

[21] Appl. No.: 538,921

[22] Filed: Oct. 4, 1983

[30] Foreign Application Priority Data

Oct. 4, 1982 [JP] Japan ................. 57-173322
Oct. 19, 1982 [JP] Japan ................. 57-182132

[51] Int. Cl.$^4$ .............................. C08J 9/10
[52] U.S. Cl. .................... 521/135; 521/88; 521/92; 521/907; 524/109; 525/115
[58] Field of Search ............... 525/115; 521/135, 88; 524/109

[56] References Cited

U.S. PATENT DOCUMENTS 3,277,208 10/1966 Nersasian ........................... 525/115
3,288,884 11/1966 Sonnabend et al. ............... 525/115
3,960,784 6/1976 Rubens ............................... 521/135
3,962,157 6/1976 Nakamo et al. ................... 521/135

Primary Examiner—Morton Foelak
Attorney, Agent, or Firm—Scully, Scott, Murphy & Presser

[57] ABSTRACT

The present invention relates to a flame-retardant polyolefin foam comprising a polyolefinic thermoplastic resin consisting mainly of a homopolymer of α-olefin or copolymer of α-olefins having 2 to 10 carbon atoms; 2 to 10 percent by weight as bromine content, based on the weight of the foam, of a bisphenol A-based brominated epoxy resin or a crosslinked product thereof; and 0 to 25 percent by weight, based on the weight of the foam, of an inorganic filler. The foam of the present invention has superior flame retardancy and thermoformability in addition to the superior heat insulating property and shock absorbing property of the polyolefin foam, and because of these superior characteristics it is useful as an automotive interior material, etc.

11 Claims, No Drawings

FLAME-RETARDANT POLYOLEFIN FOAM

BACKGROUND OF THE INVENTION

(1) Field of the Invention

The present invention relates to a flame-retardant polyolefin foam and more particularly to a polyolefin foam which is flame-retardant and superior in thermoformability.

(2) Description of the Prior Art

As the prior art concerning a flame-retardant polyolefin foam, there is known the art in which 5–30 parts by weight of a halogen-containing flame retardant and 50–500 parts by weight of a hydrated metal oxide are added to 100 parts by weight of an ethylene-vinyl acetate copolymer resin (EVA resin) and the resulting composition is crosslinked and foamed, as shown in U.K. Laid-Open Patent Application GB 2070021A.

In the above prior art process, however, since the amount of additives added to the base resin, such as a flame retardant, a hydrated metal oxide, etc., is as large as 60 to 580 parts by weight based on 100 parts by weight of the base resin, the strength and elongation and thermoformability of the resultant foam are deteriorated, although a superior flame retardancy is obtained.

In general, from the standpoint of thermoformability, the larger the amount of additives, the less desirable as explained above, and if the compatibility and adhesion between additives and a base resin are poor, both may come off at their interface, the escape of gas evolved from a blowing agent is likely to occur and coarse cells are easily formed, during heat-foaming. As a result, the obtained foam is inferior in tensile strength and tensile elongation and in formability.

The present inventors succeeded in obtaining a polyolefin foam superior in both flame retardancy and thermoformability by incorporating 2 to 10 wt. % (as bromine content) of a bisphenol A-based brominated epoxy resin or a crosslinked product thereof which are highly compatible with polyolefins as a flame retardant, into the polyolefin foam, and by also incorporating or not incorporating therein 0 to 25 wt. % of an inorganic filler, the inorganic filler thus being not used at all or being used in a small amount. Such a polyolefin foam superior in both flame retardancy and thermoformability has not been known.

SUMMARY OF THE INVENTION

It is an object of the present invention to provide a polyolefin foam which does yield hardly drips when burnt and which is superior in flame retardancy.

It is another object of the present invention to provide a flame-retardant polyolefin foam superior in thermoformability.

It is a further object of the present invention to provide a flame-retardant polyolefin foam which is useful as an automotive interior material, a building material such as a heat insulating ceiling, floor or wall material, and in any other uses which utilize the superior flame retardancy and thermoformability of the foam.

More specifically, the present invention is concerned with a flame-retardant polyolefin foam comprising a polyolefinic thermoplastic resin consisting mainly of a homopolymer of α-olefin or copolymer of α-olefins having 2 to 10 carbon atoms; 2 to 10 wt. % as bromine content, based on the weight of the foam, of at least one flame retardant selected from a bisphenol A-based brominated epoxy resin and a crosslinked product thereof; and 0 to 25 wt. %, based on the weight of the foam, of an inorganic filler.

DESCRIPTION OF PREFERRED EMBODIMENT

Preferred examples of the polyolefinic thermoplastic resin used in the present invention are crystalline olefin polymers having a density of 0.910 to 0.970 g/cm$^3$. More concretely, there may be used homopolymers of α-olefins having 2 to 10 carbon atoms such as, for example, ethylene, propylene, butene-1 and 4-methylpentene-1, as well as copolymers of two or more thereof and mixtures of these polymers. Above all, polyethylenic and polypropylenic thermoplastic resins are preferred.

Preferred examples of polyethylene resins are low-, medium- and high-density polyethylenes. Above all, low density polyethylenes having a density of 0.910 to 0.935 g/cm$^3$ and a melting point not higher than 115° C. and medium density polyethylenes having a density of 0.915 to 0.945 g/cm$^3$ and a melting point of 115° to 130° C. are preferred.

Examples of low density polyethylenes are "Mirason #16" (melting point 110° C., density 0.923 g/cm$^3$) and "Mirason #24H" (melting point 108° C., density 0.921 g/cm$^3$) both manufactured by Mitsui Polychemical Co.; "Sumikathene F702" (melting point 110° C. density 0.922 g/cm$^3$) and "Sumikathene F704" (melting point 113° C., density 0.927 g/cm$^3$) both manufactured by Sumitomo Chemical Co.; "Petrothene 112" (melting point 111° C., density 0.924 g/cm$^3$) and "Petrothene 115" (melting point 107° C., density 0.921 g/cm$^3$) both manufactured by Toyo Soda Manufacturing Co.

Medium density polyethylenes which may be used in the present invention are copolymers of ethylene and small amounts of α-olefins having 3 to 10 carbon atoms. Those copolymers are usually prepared by the so-called medium or low pressure process such as the Ziegler process or Phillips process. Examples of the above α-olefins of $C_3$ to $C_{10}$ include propylene, 1-butene, 1-pentene, 1-hexene, 3,3-dimethyl-1-butene, 4-methyl-1-pentene and 4,4-dimethyl-1-pentene.

In order to obtain medium density polyethylenes of a density in the above-mentioned range, it is preferable that the ethylene content be in the range of 88 to 97 wt. %, although it differs according to the kind of α-olefin used.

The polypropylene resin used in the present invention is a crystalline polypropylene having a good stereospecificity such as one prepared by polymerization using a Ziegler type catalyst, or a copolymer having a propylene content not lower than 70 wt. %. Preferred examples are crystalline propylene-ethylene random copolymers having a high randomness and having an ethylene content of 1 to 15 wt. %, a random factor (k) not larger than 0.7 and an isotacticity (I.I.) (percent extracted residue with boiling n-heptane) not lower than 40%.

The random factor (k) of the copolymer referred to herein indicates a value represented in terms of absorbancy ratio (A720/A731) at 720 cm$^{-1}$ and 731 cm$^{-1}$ which is attributable to the ethylene component in the infrared absorption spectrum of the copolymer measured at room temperature. The smaller the random factor (k), the more randomly is distributed the copolymerized ethylene in the polymer chain.

The melt fluidity of these resins is restricted by the extrudability and the sheet formability in extrusion after mixing with the flame retardant, inorganic filler and flowing agent. It is desirable that in the case of polyethylene, its melt index (M.I.) be in the range of 0.5 to 50 g/10 min., and in the case of polypropylene, its melt flow rate (M.F.R.) be in the range of 0.5 to 50 g/min.

Among the above-mentioned polyolefinic thermoplastic resins, the following afford a flame-retardant polyolefin foam having a superior thermoformability: a blend of a low density polyethylene (70-40 wt. %) and an ethylene/$C_3$-$C_{10}$ α-olefin copolymer (30-60 wt. %) having an ethylene content of 88 to 97 wt. %, or a blend of a crystalline propylene/ethylene random copolymer (90-30 wt. %) having an ethylene content of 1 to 15 wt. % and an ethylene/$C_3$-$C_{10}$ α-olefin copolymer (10-70 wt. %) having an ethylene content of 88 to 97 wt. %. Preferably, in these blends, if the blending ratio of the medium density polyethylene (ethylene/α-olefin copolymer) is selected in the above-mentioned range, the kneadability of the flame retardant and blowing agent in the polyolefinic thermoplastic resin and melt extrudability of the blends are good and the tensile elongation and thermoformability of the resultant foam are improved, with few coarse cells being formed.

The bisphenol A-based brominated epoxy resin referred to herein indicates the diglycidyl ether of tetrabromobisphenol A represented by the following formula 1 or a brominated epoxy resin consisting mainly of such diglycidyl ether as represented by the following formula 2:

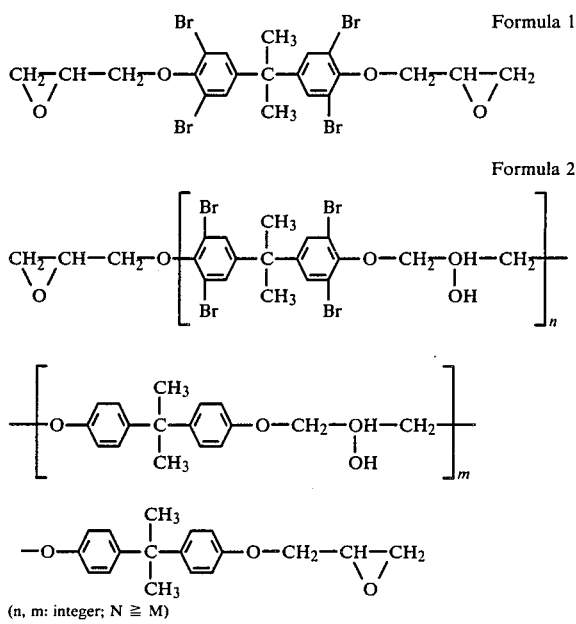

($n$, $m$: integer; $N \geq M$)

Preferably, these bisphenol A-based brominated epoxy resin have an equivalent of 200 to 2000 and a molecular weight of 400 to 4000. Commercially available examples are "SUMIEPOXY" ESB-340, 400, 500 and 700 manufactured by Sumitomo Chemical Co.; "DER-511 and 542" manufactured by Dow Chemical Co.; and "1045-B-80" and "DX-248-B-80" manufactured by Shell Chemical Co.

The crosslinked product of the bisphenol A-based brominated epoxy resin referred to herein is a product obtained by crosslinking a bisphenol A-based brominated epoxy resin alone or a mixture of two or more thereof having different bromine contents or a mixture of these brominated epoxy resins with a known epoxy resin, three-dimensionally by using a conventional curing agent for epoxy resin, which crosslinked product is thereby rendered insoluble and infusible.

As the curing agent required for the three-dimensional crosslinking of the brominated epoxy resin, there may be used any conventional curing agent for epoxy resin, examples of which include amine catalysts such as ethylenediamine, diethylenetriamine, triethylenetetramine, methaphenilenediamine, 4,4′-diaminodiphenylmethane, 4,4′-diaminodiphenylsulfone and boron trifluoridemonoethylamine complexes; acid anhydride catalysts such as maleic anhydride, phthalic anhydride and methylhymic anhydride; as well as dicyandiamide, imidazole and polyamide resins, with boron trifluoridemonoethylamine complexes being particularly preferred.

The flame-retardant polyolefin foam of the present invention consists mainly of the foregoing polyolefinic thermoplastic resin incorporating 2.0-10 wt. % (as bromine content) of the bisphenol A-based brominated epoxy resin or a crosslinked product thereof into the polyolefin foam. The density of the foam is preferably in the range of 0.1 to 0.01. The cells of the foam are closed cells. Preferably, the foam of the present invention is crosslinked and its shape is sheet-like.

In the prsent invention, as mentioned above, it is necessary that the bisphenol A-based brominated epoxy resin or a crosslinked product thereof be contained in the foam in an amount of 2-10 wt. % as bromine content. Its content lower than 2 wt. % is not desirable because the foam would be deficient in its shape retaining property based on carbonization during burning and yield drips. On the other hand, if the said bromine content exceeds 10 wt. %, the flame retardancy is improved, but the elongation of the polyolefinic base resin is deteriorated and consequently the thermoformability, whose improvement is one of the objects of the present invention, is deteriorated. Therefore, the bromine content exceeding 10 wt. % is not desirable, either.

If the content of the bisphenol A-based brominated epoxy resin or a crosslinked product thereof is in the range of 2 to 10 wt. %, preferably 2 to 5 wt. %, as bromine content, the carbonization of the polyolefinic base resin is promoted during burning, so the shape retaining property is enhanced and there is obtained a superior flame retardancy not causing the drip phenomenon, and the foam exhibits a superior thermoformability when subjected to vacuum forming or compression molding.

The "drip" referred to herein indicates a molten drip of the burnt portion of the foam in a burning test of the foam which is held horizontally, and the "shape retaining property" referred to herein indicates the state in which such burnt portion is difficult to undergo softening and deformation.

The bromine content of the bisphenol A-based brominated epoxy resin or a crosslinked product thereof used in the present invention is not specially limited, but preferably it is in the range of 16 to 52 wt. %, more preferably not lower than 40 wt. %.

In general, in case the epoxy resin or a crosslinked product thereof has a high bromine content (such as 46-50 wt. %), only 5 to 10 wt. % addition thereof into the foam would afford a sufficient shape retaining property and a high flame retardancy. In case its bromine content is low (such as 18-25 wt. %), its addition in a larger amount ranging from 15 to 30 wt. % would afford the same effect.

The preferable inorganic filler used in the present invention is antimony trioxide or a hydrated metal oxide such as, for example, aluminum hydroxide, magnesium hydroxide, hydrated tin oxide or hydrated zirconium oxide. Antimony trioxide is particularly preferred because, when combined with the flame retardant used in the present invention, i.e., the bisphenol A-based brominated epoxy resin or a crosslinked product thereof, antimony trioxide permits an effective flame-retardation of the polyolefin foam.

The amount of the inorganic filler is in the range of 0 to 25 wt. %, preferably 0 to 10 wt. %. If the inorganic filler is added in excess of this upper limit, the elongation of the foam will be deteriorated to a large extent and its thermoformability will become poor.

Usually, the inorganic filler has an average particle diameter of 0.05 to 60μ, preferably 0.1 to 10μ. If the inorganic filler having this range of an average particle diameter, the formed sheet will be free from wave surface and there will be no lowering of the expansion ratio caused by the escape of gas at the time of foaming; besides, a uniformly dispersed state can be obtained with good reproducibility, thus permitting the foam to have a uniform quality.

Especially, if antimony trioxide is used together with a halogen-containing flame retardant, there is produced an antimony halide of a large specific gravity, which intercepts oxygen, that is, enhances the flame-retarding effect.

There is no special limitation about antimony trioxide which may be used in the present invention, although a slight difference is recognized in crystal form, true specific gravity, etc., depending on the producing district. It is desirable that the antimony trioxide used in the present invention be of an average particle diameter ranging from 0.1 to 10μ, preferably 0.5 to 5μ. Commercially available antimony trioxide usually has an average particle diameter of 1 to 2μ and a true specific gravity of 5 to 6, which is applicable to the foam of the present invention. Provided, however, that such antimony trioxide may have a high content of adsorbed water, so preferably it is dried before use to minimize the water content.

The foam of the present invention may further contain another flame retardant such as, for example, a halogen-containing compound or a phosphorus compound, as well as a heat stabilizer, an ultraviolet absorbent, a plasticizer, a pigment, etc, as long as the objects of the present invention are not impaired.

The manufacturing process for the thermoplastic resin foam of the present invention will be described below.

To the polyolefinic thermoplastic resin are added 2-10 wt. % as bromine content, based on the resulting foam, of the bisphenol A-based brominated epoxy resin or a crosslinked product thereof, a thermally decomposable blowing agent and, if required, an auxiliary flame retardant, the inorganic filler, a chemical crosslinking agent, etc.

As to the blowing agent, since about 50 wt. % thereof is lost as an expandable gas, it is necessary that the amount of the bisphenol A-based brominated epoxy resin or a crosslinked product thereof incorporated in the foam be decided in consideration of the amount of the blowing agent lost.

The crosslinked product of the bisphenol A-based brominated epoxy resin may be incorporated in the foam by adding, at the stage of a brominated epoxy prepolymer obtained by prepolymerization using a curing agent, the prepolymer into the starting foam composition, then forming the mixture into a sheet and allowing the prepolymer to be crosslinked by heating at the time of foaming, or alternatively, by treating the said prepolymer at a high temperature to allow it to be crosslinked three-dimensionally and then adding the crosslinked prepolymer to the polyolefin resin.

The bisphenol A-based brominated epoxy resin may be prepolymerized in known manner. It is desirable to select prepolymerization conditions according to the curing agent used because the conditions differ, depending on curing agents. Various known curing agents are employable. Above all, it is most desirable to use a boron trifluoride-monoethylamine complex which permits the polymerization reaction to proceed mildly and which easily affords a desired degree of polymerization. In case, for example, "ESB-400" is used as the brominated epoxy resin and a boron trifluoride-monoethylamine complex is used as the curing agent, the latter may be added in an amount as small as 1 to 5 parts by weight based on 100 parts by weight of the former. By reacting both, for example, at 100° C. for 1 to 6 hours under stirring, there can be obtained a prepolymer. The prepolymerization is for permitting an easy three-dimensionarization in the subsequent heat treatment, so the minimum amount of the curing agent may be incorporated in the polymer. The curing agent may be used in an amount up to the extent not causing gelation.

In the case of obtaining a three-dimensionally crosslinked product by heat-treating the prepolymer of the bisphenol A-based brominated epoxy resin the crosslinked product obtained by heat treatment of a bulk prepolymer is extremely hard and it is somewhat troublesome to reduce it to a uniform and fine powder. On the other hand, the crosslinked product obtained by heat-treating an already pulverized prepolymer (for example, at 150° C. for 15 minutes or at 180° C. for 5 minutes) can be pulverized easily. If the prepolymer powder is heat-treated as a mixture with other inorganic filler, there can be obtained more easily a powdered crosslinked product of the brominated epoxy resin.

The three-dimensionally crosslinked product thus pulverized is then mixed and dispersed uniformly into the thermoplastic resin together with the blowing agent and other additives.

The bisphenol A-based brominated epoxy resin or a crosslinked product thereof may be incorporated in the foam by various methods as previously noted. Above all, the method involving mixing the prepolymer powder of the bisphenol A-based brominated epoxy resin into the starting foam composition, forming the mixture into a sheet and then allowing the sheet to be heated in the foaming step is most desirable because of merits such that the prepolymer powder is molten and highly compatible with the polyolefin resin during sheet forming, thus providing a good extrudability, and that also in the foaming step it acts as a resin component in the cell membrane accompany with crosslinking reaction, thus preventing deterioration of the elongation.

As the thermally decomposable blowing agent used in the present invention, there may be used any thermally decomposable blowing agent which does not undergo a thermal decomposition at the stage of sheet forming by melt-extrusion of the resinous composition of the present invention. For example, there may be used azodicarbonamide, hydrazodicarbonamide, barium salt of azodicarboxylic acid, dinitrosopentamethylenetetramine and nitroguanidine, alone or in combination. Particularly, azodicarbonamide is preferred in view of its decomposition temperature and the amount of decomposed gas. Azodicarbonamide having a main decomposition temperature not lower than 196° C. is more preferable.

The "main decomposition temperature" referred to herein means the temperature at which the yellow color of a sample of the blowing agent disappears completely in a test conducted using a melting point measuring instrument defined by JIS K-8004. In this test, the sample is charged closely into a capillary tube by about 5 mm, and when the temperature of the measuring instrument reached 190° C., the capillary tube charged with the sample is inserted therein, then the temperature is raised up to 196° C. at a rate of 2° C. per minute and is subsequently further raised at a rate of 1° C. per minute, allowing the blowing agent to be thermally decomposed.

The resinous composition incorporating the additives may be mixed by using a conventional mixing machine such as, for example, a heated roll mill, a kneader or a Banbury mixer. Further, the resulting mixture may be formed into pellets or chips by means of an extruder.

The thus-kneaded mixture is then formed into a sheet through a melt extruder. The sheet thus formed is then crosslinked by electron beam radiation or by using a chemical crosslinking agent such as, for example, an organic peroxide.

Usually, for crosslinking the polyolefin resin, at the stage of sheet formed by melt extrusion or pressing, the sheet is heated and chemically crosslinked or crosslinked by ionizable beam radiation.

In the case of a chemical crosslinking, a chemical crosslinking agent such as, for example, an organic peroxide is mixed beforehand into the starting foam composition, which is then melt-kneaded, and after forming to the suitable shape, crosslinking is allowed to take place by heating. As the heating temperature, a temperature at which the blowing agent does not decompose is preferred.

Preferred examples of organic peroxides which may be used for chemical crosslinking are those having a decomposition temperature lower than the decomposition temperature of the blowing agent, preferably a decomposition temperature not lower than 130° C., more preferably not lower than 150° C., in case the period of half decomposition is one minute. Examples of such organic peroxides include dicumyl peroxide, di-tert-butyl peroxide, 1,3-bis(tert-butyl peroxyisopropyl)-benzene, 4,4-di-tert-butyl peroxyvaleric acid n-butyl ester, 1,1-di-tert-butylperoxy-3,3,5-trimethylcyclohexane, α, α'-bis(tert-butylperoxy)-p-diisopropylbenzene, and 2,5-dimethyl-2,5-di(tert-butylperoxy)hexyne-3. The organic peroxide may be used in an amount of 0.05 to 15, preferably 1 to 5, parts by weight based on 100 parts by weight of the resin component. Suitable crosslinking conditions involve temperatures of 140° to 200° C. and periods of 1 to 30 minutes.

In the case of an ionizable radiation crosslinking, there may be used high-energy beams such as α-, β-, γ- and X-rays as well as accelerated proton beam, electron beam and neutron beam. Usually, a high-energy electron beam irradiator is used, whereby the formed sheet is crosslinked at a dose of, for example, 1 to 50 Mrad.

The degree of crosslinking suitable for the foam of the present invention is preferably 10 to 60%, more preferably 15 to 50%, in terms of gel content. By controlling the degree of crosslinking within this range, the formation of coarse cells is prevented, the escape of gas to the exterior of the foam is minimized, and there can be obtained a foam having a high expansion ratio. Further, the foam exhibits little deterioration of its elongation during heating and is superior in thermoformability. The "gel content" referred to herein means the weight percent of an insoluble portion when 0.2 g. of a sample is immersed in 50 ml. of tetralin at 135° C. for 3 hours.

In the crosslinking with ionizable radiation, a crosslinking promotor may be added in an amount of 0.1 to 10 parts by weight based on 100 parts by weight of the α-olefinic resin. Particularly, the following polyfunctional compounds are suitable: divinylbenzene, diallylbenzene, divinylnaphthalene, divinylbiphenyl, divinylcarbazole, divinylpyridine, and nuclear substituted derivatives thereof; polyacrylates and polymethacrylates of aromatic polyhydric alcohols such as ethylene glycol dimethacrylate and hydroquinone dimethacrylate; polyvinyl esters, polyallyl esters, polyacryloyloxy alkyl esters and polymethacryloyloxy alkyl esters of aliphatic and aromatic polyvalent carboxylic acids such as divinyl phthalate, diallyl phthalate, diallyl maleate and bisacryloyloxy ethyl terephthalate; polyvinyl ethers and polyallyl ethers of aliphatic and aromatic polyhydric alcohols such as diethylene glycol divinyl ether, hydroquinone divinyl ether and bisphenol A diallyl ether; as well as triallyl cyanurate, triallyl phosphate and trisacryloyloxy ethyl phosphate.

The thus-crosslinked sheet is then heated to a temperature not lower than the decomposition temperature of the blowing agent under atmospheric pressure or under application of pressure, whereby the blowing agent decomposes rapidly and the desired foam is obtained. It is preferable that the sheet be foamed continuously under atmospheric pressure by means of a heat-foaming machine. For example, the sheet may be foamed by being heated with hot air and an infrared heater on a wire-netted belt conveyor, or may be foamed by being suspended from an upper part and heated with hot air and an infrared heater, or may be foamed by being floated on a liquid heat transfer medium such as, for example, a heat-melted salt and heated from above with an infrared heater or hot air. Various other known foaming methods may also be adopted. The foam thus obtained usually has a density of 0.1 to 0.01 (expansion ratio: 10~100). From the aspect of physical properties, it is preferable that the foam have a density of 0.05 to 0.02.

By incorporating a predetermined amount of the bisphenol A-based brominated epoxy resin or a crosslinked product thereof into the polyolefin foam in the manner described above according to the present invention, the following excellent characteristics can be obtained in addition to general characteristics of the polyolefin foam such as heat insulating property and shock absorbing property:

(1) Superior flame retardancy.
(2) Superior thermoformability.

The flame-retardant polyolefin foam of the present invention is suitable particularly as an automotive interior material, a building material such as a heat insulating ceiling, floor or wall material, and in any other uses requiring a high degree of flame retardancy and a high degree of thermoformability.

The measured values referred to herein are the values obtained according to the following methods.

(1) Melting Point of Polymer: Shown in terms of an endothermic peak temperature of melting after once melting and recrystallization (second stage) measured by a differential scanning calorimeter (DSC).

(2) Density of Polymer: Measured according to the density gradient tube method defined by ASTM D1505.

(3) Density of Foam: A sample is taken out in the form a 10cm ×10cm square and its thickness is measured to calculate its volume. On the other hand, its weight is measured and the weight per unit volume is assumed equal to the density (apparent density) of the foam.

(4) Bromine Content: A predetermined amount is sampled from the foam and weighed exactly. The sample is decomposed according to the flask burning method and its generated gas is introduced into alkaline aqueous solution and then its absorbed solution is subjected to a potentiometric titration with a silver nitrate solution using a silver electrode. The amount of bromine is obtained from the titration curve thereby obtained, and its content in the foam is calculated.

(5) Dripping Property and Shape Retaining Property: In a burning test of a horizontally-held sample, the dripping degree (dripping property) and softening degree (shape retaining property) of the burnt portion are shown in terms of the following criteria.

A: Does not drip, and the shape retaining property is good.

B: Drips, but in a relatively small amount, and the shape retaining property is of a medium degree.

C: Dripping is conspicuous, and there is recognized no shape retaining property.

(6) Flame Retardancy of Foam: Shown in terms of a burning rate (mm/min) measured in accordance with MVSS 302. The foam which is extinguished before marked line (25 mm from the catch fire point) is evaluated as Self-extinguishing. As to the criterion of flame retardancy, the foam which burns at a rate not higher than 60 mm/min is evaluated as Acceptable.

(7) Thermoformability of Foam: Shown in terms of a draw ratio, H/D, at the limit of a cup-like elongation of the foam without breakage when the foam is subjected to vacuum forming by being heated in a vertical cup-like mold having a bottom diameter D and a depth H under optimum heating condition by means of a vacuum forming machine. When this value is 0.5 or more, preferably 0.6 or more, it can be judged that the foam is superior in thermoformability. The bottom diameter D may be set at any value, but in this formability test it was set at 50 mm. The following examples are given to further illustrate the present invention.

EXAMPLE 1

82 wt. % of a low density polyethylene ("Mirason #16," a product of Mitsui Polychemical Co.), 9 wt. % of "ESB-400" (bromine content: 46–56 wt. %, a product of Sumitomo Chemical Co.) as the bisphenol A-based brominated epoxy resin and 9 wt. % of azodicarbonamide as a blowing agent were mixed thoroughly by means of a Henschel mixer, and the mixture was pelletized by means of a biaxial 30 mm-dia. extruder.

The pellets were melt-extruded at 135° C. by means of a 30 mm-dia. extruder to obtain a 1.6 mm thick sheet. The sheet was crosslinked by electron beam radiation at a dose of 5 Mrad by means of an electron beam irradiator. The crosslinked sheet was then foamed by being heated in a heat-melted salt bath aat 220° C. to obtain a polyethylene foam having a density of 0.031 g/cm$^3$.

This foam proved to have such characteristics as shown in the column of Example 1 in Table 1. In the burning test, moreover, this foam proved to be Self-extinguishing because it was extinguished before the marked line (25 mm from the catch fire point). Drip was not recognized during burning. After fire extinguishing, a large amount of carbon was produced in the burnt portion, greatly contributing to a good shape retaining property. Further, the H/D ratio in the vacuum forming test was found to be 0.54, proving a superior thermoformability.

EXAMPLE 2

Forming, crosslinking and foaming were performed in the same way as in Example 1 except that a prepolymer of "ESB-400" was used in place of the "ESB-400" and that there were used 4.5 wt. % of Sb$_2$O$_3$ and 18 wt. % of aluminum hydroxide, to obtain a polyethylene foam.

The polyethylene foam proved to have such characteristics as shown in the column of Example 2 in Table 1, and was found to be superior in both flame retardancy and thermoformability because it satisfied all the requirements of the present invention.

COMPARATIVE EXAMPLE 1

Forming, crosslinking and foaming were performed in the same way as in Example 1 except that 2.7 wt. % of "ESB-400" was used in place of 9 wt. % of "ESB-400" and that there was used 2.7 wt. % of Sb$_2$O$_3$, to obtain a polyethylene foam. This foam yielded drips during burning, showing an inferior flame retardancy, and this result is ascribable to the fact that the requirement of the present invention concerning the bisphenol A-based brominated epoxy resin is not satisfied in point of the amount used, which was very small.

EXAMPLES 3–5, COMPARATIVE EXAMPLES 2–4

A low density polyethylene having a melting point of 109° C., a density of 0.923 g/cm$^3$ and a melt flow rate of 3.7 g/10 min, a 9% hexene-copolymerized medium density polyethylene having a melting point of 122° C., a density of 0.922 g/cm$^3$ and a melt flow rate of 2.5 g/10 min., ESB-400 or a prepolymer thereof and DBE as flame retardants, Sb$_2$O$_3$ and aluminum hydroxide were mixed in the proportions shown in Table 1, then 10 wt. % of azodicarbonamide as a blowing agent and 3 phr (per hundred resin) of ethylene glycol dimethacrylate as a crosslinking promotor were added, followed by kneading at 160° C. and forming into a 2.5 mm thick sheet by means of a 40 mm-dia. extruder. The sheet was irradiated with electron beam at an accelerated voltage of 750 kV so as to give an electron beam radiation dose of 6 Mrad, then immersed in a heat-melted salt bath at 220° C. and heat-foamed until the blowing agent was decomposed nearly completely.

The foam thus obtained was taken out from the salt bath, washed with acetone and water and then dried. Table 1 shows results of evaluation on characteristics of this foam.

Examples 3 through 5 all satisfy the requirements of the present invention and the foams obtained therein proved to be superior in both flame retardancy and thermoformability. On the other hand, Comparative Examples 2 through 4 do not satisfy the requirement of the flame retardant or that of the inorganic filler defined in the present invention, and consequently the foams obtained therein are inferior in both or either of flame retardancy and thermoformability.

EXAMPLE 6

Into a mixture of 61.6 wt. % of a crystalline propylene/ethylene copolymer as polypropylene resin having an ethylene content of 5 wt. %, an isotacticity (I.I.) of 88%, a random factor (k) of 0.35 and a melt flow rate of 2.5 g/10 min. and 15.4 wt. % of a medium density polyethylene with a small amount of 4-methylpentene-1 copolymerized therewith having a melting point of 122° C. and a density of 0.922, were added 7 wt. % of ESB-400 as a flame retardant, 3 wt. % of $Sb_2O_3$ 9 wt. % of azodicarbonamide as a blowing agent and 4 phr of divinylbenzene as a crosslinking promotor and mixed by means of a Henschel mixer. The mixture was formed into a 2.0 mm thick sheet by means of a 40 mm-dia. extruder under conditions under which the resin temperature did not exceed 175° C. The sheet was irradiated with electron beam so as to give an electron beam radiation dose of 6 Mrad and was thereby crosslinked. Then, the sheet was immersed in a molten salt bath at 220° C. and heat-foamed until the blowing agent was decomposed almost completely.

The foam thus obtained was taken out from the molten salt bath, washed with acetone and water and then dried. The foam, whose density was 0.033 g/cm³, proved to be Self-extinguishing because it was extinguished before the marked line (25 mm from the catch fire point). In the vacuum forming test, the H/D ratio of the foam was 0.72 and thus the thermoformability of the foam was extremely superior.

COMPARATIVE EXAMPLE 5

Forming, crosslinking and foaming were performed in the same way as in Example 6 except that the polypropylene resin and the medium density polyethylene resin were used in amounts of 54.4 and 13.6 wt. %, respectively, and that 20 wt. % of DBE was used as a flame retardant. The foam thereby obtained was inferior in both flame retardancy and formability because the requirements of the present invention were not satisfied.

TABLE 1

| | Examples 1-5, Comparative Examples 1-5 | | | | | | | | | | |
|---|---|---|---|---|---|---|---|---|---|---|---|
| | Examples | | | | | | Comparative Examples | | | | |
| | 1 | 2 | 3 | 4 | 5 | 6 | 1 | 2 | 3 | 4 | 5 |
| Low Density Polyethylene | 82 | 59.5 | 66 | 64 | 44 | 0 | 85.6 | 40 | 46 | 40 | 0 |
| Medium Density Polyethylene | 0 | 0 | 16 | 16 | 11 | 16.2 | 0 | 10 | 12 | 10 | 13.6 |
| Polypropylene Resin | 0 | 0 | 0 | 0 | 0 | 64.8 | 0 | 0 | 0 | 0 | 54.4 |
| "EBS-400" | 9 | 0 | 5 | 10 | 0 | 7 | 2.7 | 0 | 0 | 25 | 0 |
| "EBS-400" Prepolymer | 0 | 9 | 0 | 0 | 20 | 0 | 0 | 10 | 0 | 0 | 0 |
| DBE | 0 | 0 | 0 | 0 | 0 | 0 | 0 | 0 | 20 | 0 | 20 |
| $Sb_2O_3$ | 0 | 4.5 | 3 | 0 | 5 | 3 | 2.7 | 5 | 2 | 5 | 3 |
| Aluminum Hydroxide | 0 | 18 | 0 | 0 | 10 | 0 | 0 | 25 | 10 | 10 | 0 |
| Foam Density (g/cm³) | 0.031 | 0.035 | 0.032 | 0.030 | 0.034 | 0.033 | 0.035 | 0.038 | 0.045 | 0.033 | 0.040 |
| Bromine Content (wt. %) | 4.6 | 4.4 | 2.3 | 4.6 | 9.2 | 3.2 | 1.3 | 4.7 | 15.1 | 12.1 | 14.9 |
| Dripping Property and Shape Retaining Property | A | A | B | A | A | A | C | A | C | A | C |
| Flame Retardancy (mm/min) | Self-extinguishing | Self-extinguishing | Self-extinguishing | Self-extinguishing | Self-extinguishing | Self-extinguishing | 135 | Self-extinguishing | 120 | Self-extinguishing | 110 |
| Thermoformability (H/D) | 0.54 | 0.52 | 0.66 | 0.65 | 0.60 | 0.72 | 0.55 | 0.42 | 0.35 | 0.44 | 0.48 |

(Note)
The above numerical values of the components are % by weight.

What is claimed is:

1. A flame-retardant polyolefin foam comprising at least a polyolefinic thermoplastic resin selected from the group consisting mainly of a homopolymer of α-olefin having 2 to 10 carbon atoms and copolymer of α-olefins having 2 to 10 carbon atoms; 2 to 10 percent by weight as bromine content, based on the weight of the foam, of at least a flame retardant selected from the group consisting mainly of a bisphenol A-based brominated epoxy resin and a crosslinked product thereof; and 0 to 25 percent by weight, based on the weight of the foam, of an inorganic filler.

2. A flame-retardant polyolefin foam according to claim 1, wherein said polyolefinic thermoplastic resin comprises a blend of 70-40 percent by weight of a low density polyethylene and 30-60 percen by weight of an ethylene/$C_3$-$C_{10}$ α-olefin copolymer having an ethylene content of 88 to 97 percent by weight.

3. A flame-retardant polyolefin foam according to claim 1, wherein said polyolefinic thermoplastic resin comprises a blend of 90-30 percent by weight of a random propylene/ethylene copolymer having an ethylene content of 1 to 15 percent by weight and 10-70 percent by weight of an ethylene/$C_3$-$C_{10}$ α-olefin copolymer having an ethylene content of 88 to 97 percent by weight.

4. A flame-retardant polyolefin foam according to claim 1, wherein said flame retardant is a resin selected from the group consisting mainly of a diglycidyl ether of tetrabromobisphenol A and a crosslinked product thereof.

5. A flame-retardant polyolefin foam according to claim 4, wherein said diglycidyl ether of tetrabromobisphenol A has a bromine content of 16 to 52 percent by weight, an epoxy equivalent of 200 to 2000 and a molecular weight of 400 to 4000.

6. A flame-retardant polyolefin foam according to claim 1, wherein the content of said inorganic filler is in the range of 0 to 10 percent by weight based on the weight of the foam.

7. A flame-retardant polyolefin foam according to claim 1, wherein said inorganic filler is antimony trioxide.

8. A flame-retardant polyolefin foam according to claim 1, wherein said inorganic filler is a hydrated metal oxide.

9. A flame-retardant polyolefin foam according to claim 1, the foam is one having a gel content of 10 to 60 percent by weight and an expansion ratio of 10 to 100.

10. A flame-retardant polyolefin foam according to claim 1, wherein said polyolefinic thermoplastic resin comprises an ethylene/$C_3$-$C_{10}$ α-olefin copolymer having an ethylene content of 88 to 97 percent by weight.

11. A flame-retardant polyolefin foam according to claim 1, wherein said polyolefinic thermoplastic resin comprises a crystalline propylene/ethylene random copolymer having an ethylene content of 1 to 15 percent by weight, a random factor (k) not larger than 0.7 and an isotacticity (I.I.) not less than 40%.

* * * * *